Oct. 14, 1969 T. J. MARCUS 3,473,036

CODE MATRIX READER

Filed Feb. 16, 1966 3 Sheets-Sheet 1

INVENTOR.

THOMAS J. MARCUS

BY

ATTORNEY

Oct. 14, 1969 T. J. MARCUS 3,473,036

CODE MATRIX READER

Filed Feb. 16, 1966 3 Sheets-Sheet 2

Fig. 12 (a) (b) (c) (d) (e) (f)

INVENTOR.
THOMAS J. MARCUS
BY
ATTORNEY 3,473,036

CODE MATRIX READER

Thomas J. Marcus, Gahanna, Ohio, assignor to North American Rockwell Corporation, a corporation of Delaware Filed Feb. 16, 1966, Ser. No. 527,828
Int. Cl. G11b 7/14
U.S. Cl. 250—219 5 Claims

ABSTRACT OF THE DISCLOSURE

An apparatus for reading information recorded on photographic film in binary-coded form, as in a conventional code matrix block by way of example, is provided with an array of individual bit detectors that have paired matched-performance photodiode means and that exceed in number the number of different contrasted bits that are to be detected in a file of corresponding extent. Logic circuit means is combined with the detector array detectors to eliminate redundant output signals without compromising on capability to overcome otherwise unacceptable transverse misalignment between recorded information and detector array and also a capability for reading reversed contrasts without polarity switching.

Information recorded on photographic film in binary coded form is ordinarily detected or read using light transmitted through the film to either light-responsive electron beam scanning means, conventional photocell detector means, or like apparatus. The performance capability of state-of-the-art equipment for reading such recorded information is, therefore, generally recognized to be adversely affected by those changes in film density (light transparency) which cause undesirable levels of light intensity to appear at the various incorporated light sensors. One such type of film density change occurs in film background areas generally and causes unacceptable or undesirable variations in the sensor bias level; adverse factors involving emulsion composition, background area exposure conditions, film developing procedure, or the like may be responsible. Another type of undesirable film density change may occur in comparatively isolated background areas as a result of the proximity of adjacent positive bits of recorded information to each other. This type of deficiency often causes the detection of adjacent information bits as distinct entities to be unduly difficult. A still further problem with state-of-the-art equipment relates to the changing of film types during reading, as from a positive type film to a negative type film without switching for contrast reversal. In addition, known reading units have functioned with less than optimum accuracy and reliability and have required comparatively high levels of maintenance support. By use of the herein-described and claimed invention the foregoing operating problems may be avoided.

Accordingly, a primary object of this invention is to provide a code matrix reader with detector means that is essentially insensitive to variations in general background area film density and that functions with a zero bias level for all film conditions.

Another object of this invention is to provide a code matrix reader with detector means that functions to read binary coded information bits recorded in either positive or negative type photographic film without requiring switching for contrast reversal.

A still further object of this invention is to provide a code matrix reader with detector means that functions to readily distinguish bits of recorded binary coded information positioned immediately adjacent each other in rows as entities and even though undesirable film background density variations caused by the proximity of such bits to each other are present.

Another object of this invention is to provide a code matrix reader with detector means that functions to read binary coded information bits recorded on photographic film with improved accuracy and reliability and with reduced required maintenance support.

Other objects and advantages of this invention will become apparent during a consideration of the following description and drawings.

Figures 1, 2, 4, 5, 6, 7, 8:
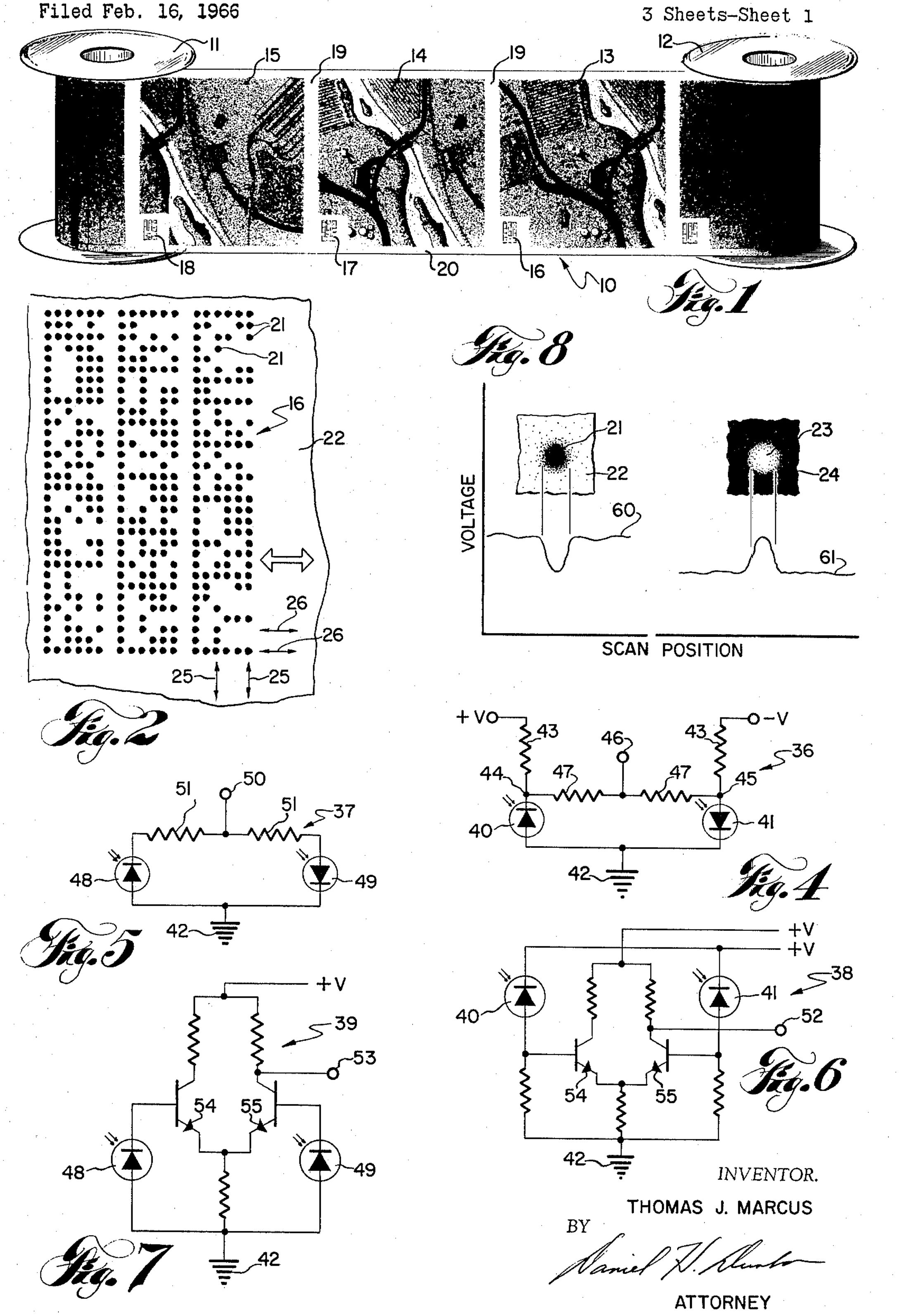
FIG. 1 illustrates photographic film of the type to which the instant invention has application for electrically reading information recorded thereon in binary coded form.
FIG. 2 illustrates an enlarged representative code matrix block from the film of FIG. 1.
Figures 3, 10:
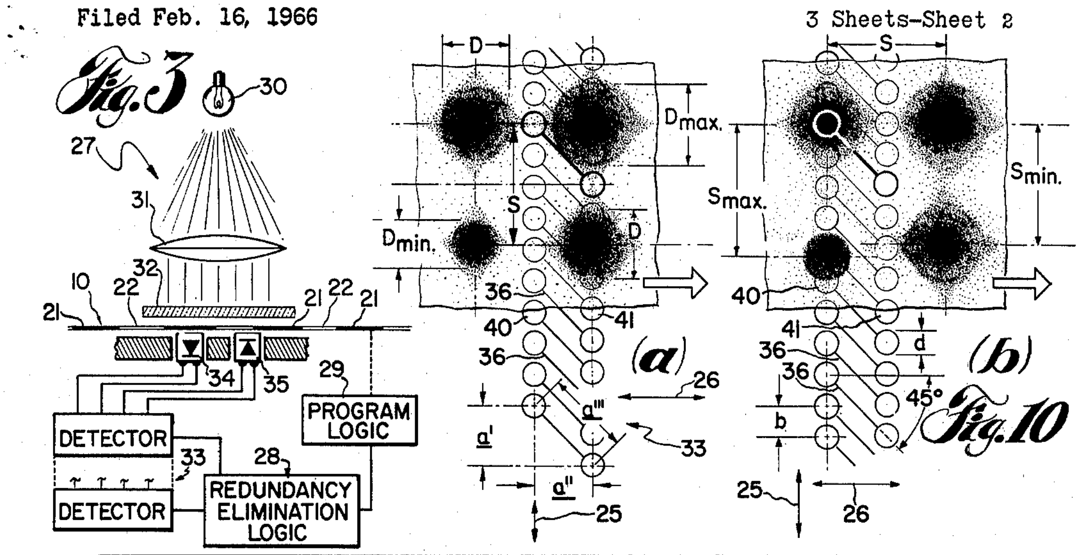
Figure 9:
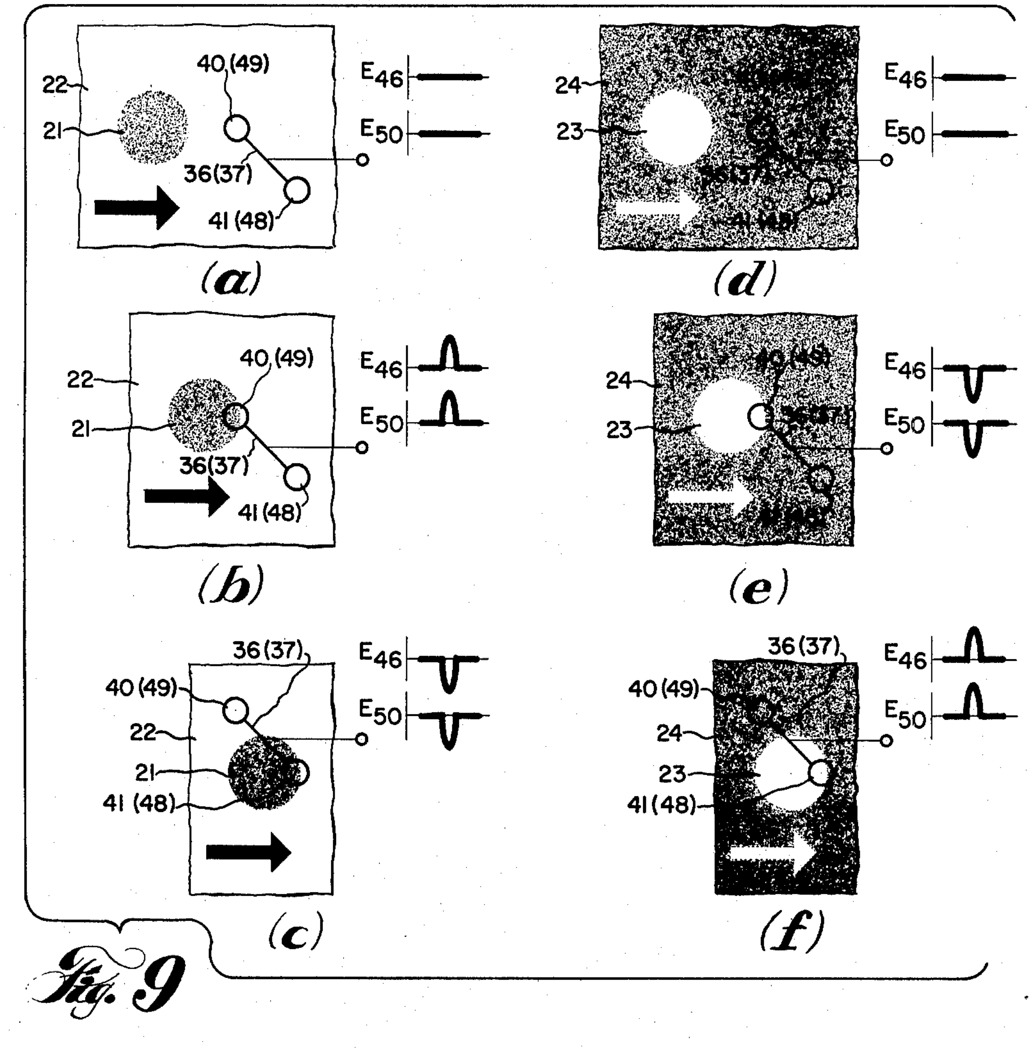
Figure 11:
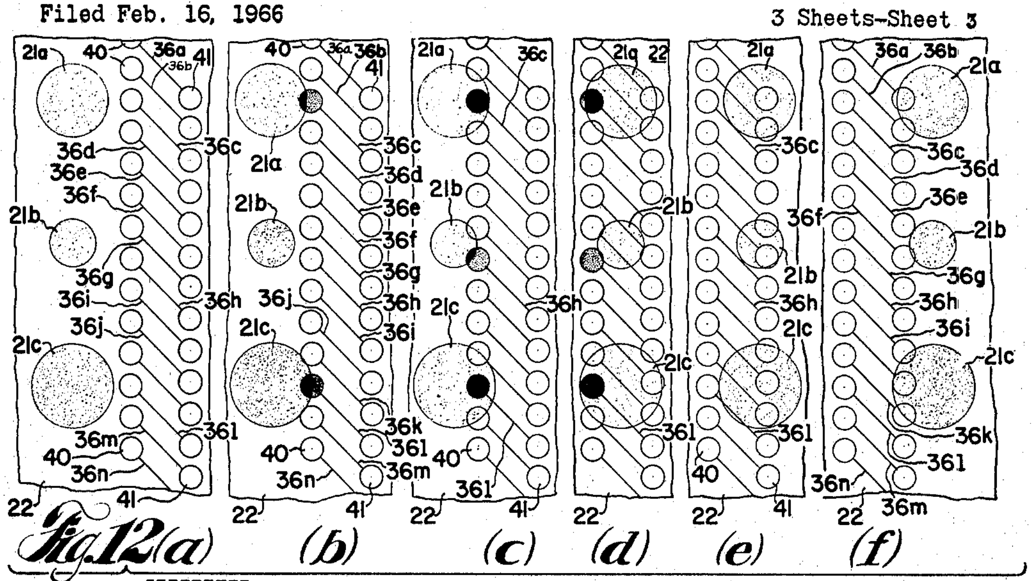
Figure 11:
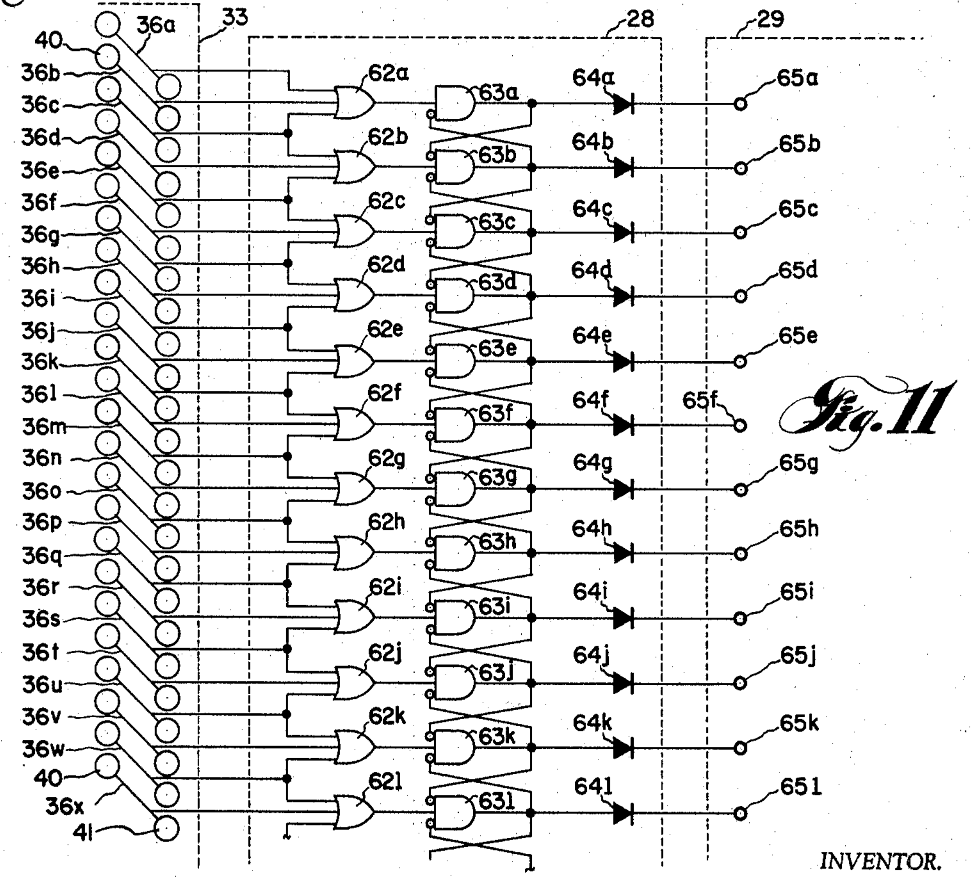

FIG. 3 schematically and functionally illustrates a code matrix reader that may be utilized to electrically read a code matrix block in accordance with the instant invention to detect and process useful recorded binary coded information;

FIG. 4 illustrates a preferred embodiment of the basic paired photodiode detector utilized in the code matrix reader sensor module of FIG. 3;

FIGS. 5 through 7 illustrate alternate embodiments for the basic paired photodiode detector utilized in the apparatus of FIG. 3;

FIG. 8 illustrates the typical voltage variations that result from reading bits of binary coded information conventionally recorded on positive film and on negative film;

FIG. 9 is provided to illustrate detector activating conditions that exist with respect to reading bits of binary coded information recorded on positive film and on negative film using a paired photodiode detector in accordance with the instant invention;

FIG. 10 provides details of the position geometry utilized in the practice of the instant invention to develop an array of paired photodiode detectors in a code matrix reader sensor module to read multiple bits of recorded binary coded information aligned generally transverse to the direction of film transport;

FIG. 11 illustrates a functional block diagram of redundancy elimination logic that is preferred for cooperation with the code matrix module paired photodiode detector array shown in FIG. 10; and FIG. 12 is provided to illustrate photodiode activating conditions that exist with respect to reading bits of binary coded information recorded in an advancing positive film file using an array of paired photodiode detectors in accordance with the instant invention.

FIGS. 1 and 2 illustrate aerial reconnaissance scene information and scene identification information recorded on negative photographic film in a conventional manner. As shown in FIG. 1, the photographic film 10 carried by film spools 11 and 12 is basically comprised of sequentially-taken frames 13, 14, and 15. Such frames record aerial reconnaissance scene details and are also provided with code matrix blocks 16, 17, and 18 respectively. Each block contains different scene identification information typically indicating aircraft altitude, air-craft heading, aircraft attitude, aircraft position, time, and similar identification details. Code matrix blocks provided in the format prescribed by United States Government Specifications MIL–STD–782B (Wep), March 20, 1965, may contain as many as sixteen (16) different items of information compressed into an area having an overall dimension that is grossly ½" x ⅜". In one particular format for photographic film 10, the individual code matrix blocks are positioned at a specified corner location relative to each frame. In other film formats, the code matrix block may be positioned in the space 19 separating adjacent frames or in a comparatively wide film edge margin 20. The instant invention functions equally well as to all such film formats, it being necessary only to properly locate the film relative to the hereinafter-described detector array provided in the code matrix reader sensor module.

FIG. 2 shows a representative code matrix block 16 at a magnified scale. As indicated in FIG. 2, code matrix block 16 is basically comprised of comparatively opaque dots 21 positioned on a relatively transparent film background 22 as in the case of normal negative film. For identification convenience, a comparatively transparent dot and a relatively opaque background such as are involved in the case of normal positive film are designated 23 and 24, respectively, in the drawings. See FIGS. 8 and 9 by way of example. Each dot 21, 23 represents a positive bit of binary coded information that typically in-part defines a portion of the recorded identification. Each vertical alignment of dots in FIG. 2 is referred to as a file and is designated 25; those dots arranged in essentially horizontal alignment are referred to as being in a row 26. Rows 26 are generally positioned at right angles relative to files 25 and normally are oriented on film 10 in a direction parallel to the direction of film movement during reading. Although not important to this invention, it should be noted that files 25 may be incorporated into groupings referred to as columns. In the FIG. 2 arrangement, for instance, there are three columns, each comprised of six files. Also, the dots positioned in the initial file of a column and the dots positioned entirely throughout particular individual rows in a column may be used for indexing or divider functions.

When prepared in accordance with the above-referenced specification, each file 25 may contain as many as 32 dots separated by 31 spaces. Spacing between files of adjacent columns is generally twice the spacing between files within a column. The table provided below, Table I, summarizes the range of variations that may be encountered in connection with binary coded bits that are recorded in accordance with the above-referenced specification. The symbols identified therein are shown also in FIG. 10 of the drawings. Although dot edges are not, in practice, sharply delineated, the mid-ordinate values of the prevailing Gaussian distribution of film density are used as dot diameter reference points.

TABLE I

| Symbol | Description | Actual value (in.) |
|---|---|---|
| D | Binary dot diameter, nominal | 0.009 |
| D max | Binary dot diameter, maximum | 0.0105 |
| D min | Binary dot diameter, minimum | 0.006 |
| S | Binary dot spacing, nominal [1] | 0.018 |
| S max | Binary dot spacing, maximum [1] | 0.021 |
| S min | Binary dot spacing, minimum [1] | 0.016 |

[1] Spacing determined on a center to center basis.

FIG. 3 schematically and functionally illustrates a code matrix reader arrangement to which the instant invention has application. As noted therein, the reader is basically comprised of a sensor module 27 in combination with redundancy elimination logic 28 and cooperating program logic 29. Useful film-recorded binary coded identification information is detected by modules 27 and 28 for subsequent processing through logic 29. In typical code matrix block reading applications, coded information provided to program logic 29 controls the operation of a film transport (not shown) and is utilized to retrieve desired film frames. It should be noted that program logic 29 is not considered to be a part of the instant invention since conventional computer program arrangements are typically involved therein. Although no details are provided in FIG. 3 or in this description with respect to a conventional magnetic-type memory unit into the FIG. 3 arrangement for accomplishing a shift function such may be utilized with the instant invention to develop the time compensation required for reading code matrix blocks wherein the files 25 are skewed relative to a detector base direction which is at right angles to the line of film movement.

Sensor module 27 of the code matrix reader includes a lamp 30, light distribution optics 31, light diffuser element 32, and an array of detectors 33 positioned beneath photographic film 10. Each detector in array 33 includes paired photodiodes 34 and 35. The FIG. 3 sensor schematic arrangement contemplates a construction wherein the light-sensitive surfaces of the photodiodes 34 and 35 in detector array 33 are essentially positioned directly adjacent to film 21. Whenever manufacturing limitations preclude such an arrangement, alternate constructions may be required. In one alternate arrangement dictated by an inability to precisely position the individual light-sensitive surfaces of the photodiodes of detector array 33 with respect to each other, optical fibers of prescribed dimension may be employed to conduct light from the plane at the underside of film 21 to the actually-positioned photodiode surfaces. In such cases it will be necessary that the optical fibers be positioned at the light-receiving plane in accordance with the hereinafter-described detector array geometry. As a further alternate arrangement, optical magnification may be employed intermediate film 21 and the detector array photodiodes; because of light intensity limitations at film 21, such optical magnification appears to be feasible only when dot size amplification is less than double. In such instances, the light-sensitive surfaces of the photodiodes receiving the magnified dot images must be positioned in accordance with the hereinafter-described detector array geometry.

Different embodiments of specific photodiode detectors suitable for use in the practice of this invention are detailed in FIGS. 4 through 7 and are referenced as 36 through 39, respectively. The embodiment shown in FIG. 4 is the preferred embodiment and the photodiodes 34 and 35 therein have the specific form of matched photoconductive junction diodes designated as 40 and 41. Such diodes normally have cadmium sulfide or the like as the light-sensitive material and have a reverse conductance that varies according to the intensity of light falling on the diode light-sensitive material. Each photodiode 40 and 41 is connected in series between ground 42 and a +V or −V DV supply potential with a resistor 43. As noted in FIG. 4, photodiodes 40 and 41 are oppositely biased with respect to parallel conductance. When equal intensities of light impinge on photo-conductive diodes 40 and 41, the potential at junctions 44 and 45 are of equal magnitude but of opposite polarity. Since such junctions are each isolated from output terminal 46 by equal-valued resistors 47, the potential at output terminal 46 will be zero whenever both diodes in the pair sense a like film density conditions. Whenever a difference in light intensity prevails as between the light-sensitive surfaces of the diodes in the pair, the change in conductance associated with the photodiode receiving the less intense or more intense light of a detected dot causes a potential to appear at output terminal 46. In the FIG. 4 arrangement, a positive potential will appear at output terminal 46 whenever photodiode 40 alone is aligned with a binary coded bit recorded on negative film (opaque dot) or whenever photodiode 41 is aligned with a binary coded bit in the form of a transparent dot recorded on positive film. See FIG. 9. In the FIG. 4 arrangement, also, binary dot detection by the other paired photodiode for the same film types will result in a negative potential appearing at output terminal 46. It should be noted that the preferred embodiment of the invention described herein is particularly developed to utilize positive potential outputs in a binary-1 form of logic system. The preferred embodiment may readily be modified using state-of-the-art techniques to utilize negative potential outputs or binary-0 logic processing. Also, conventional power amplifiers (not shown) may be utilized with any of the FIG. 4 through 6 detectors whenever such detectors individually are not capable of driving subsequent logic 28.

The detector embodiment 37 of FIG. 5 differs from the FIG. 4 arrangement primarily with respect to the use of photo-voltaic type junction diodes 48 and 49 rather than photo-conductive junction diodes. Such are used, however, with a recognized sacrifice in detector performance sensitivity over the FIG. 4 arrangement. The photodiode potentials at the opposed anode and cathode junctions of elements 48 and 49 are isolated from output terminal 50 by equal-valued resistors 51. In the absence of a detected light intensity difference, the paired photo-voltaic diode potentials of detector 37 are of equal magnitude but opposite polarity. Thus, the output appearing at terminal 50 will be zero. Whenever photodiode 49 detects a more opaque film area, as in the case of a binary dot 21 on negative film 22, a positive potential will appear at terminal 50; conversely, whenever a relatively transparent area (dot 23) is detected at photodiode 48, the positive potential that is produced will again appear at output terminal 50. As in the case of detector 36, negative potentials may be produced at output terminal 50 for the opposite reading conditions. It should be emphasized, as in the case of detector 36, that whenever the individual photodiodes of detector 37 are subjected to equal light intensities over their light-sensitive surfaces that the detector output potential is zero.

The embodiments of FIGS. 6 and 7 are substantially similar to the FIG. 4 and FIG. 5 embodiments, respectively, except that the inbalance of potentials produced with the paired photodiodes as a result of detected light intensity differences serves to drive a conventional differential amplifier arrangement. In such FIG. 6 and FIG. 7 arrangements, the differential amplifier is essentially comprised of emitter-coupled N-P-N junction transistors 54 and 55.

As shown in FIG. 8, signal biases of different magnitude exist relative to the conventional electron beam or photocell reading of different film types. Curve 60 graphically illustrates the electrical output signal potential that is typically developed as a function of the scan of negative film; increases in film density associated with a relatively opaque dot 21, for instance, result in a reduced output voltage. The output signal that is developed in connection with reading dot information on positive-type film, however, increases significantly above the normal bias level as shown by curve 61. State-of-the-art code matrix readers are generally incapable of handling significant information bias changes without requiring bias compensation to avoid amplifier saturation. Similarly, conventional logic networks do not function to distinguish between significant changes in signal bias level.

The detector arrangement of the instant invention offers numerous advantages in that the output signals involve the same zero voltage bias level for different film types thus eliminating the need for gain adjustment features or modified logic operation. FIG. 9 illustrates the typical zero reference level signal forms that are developed by this invention with respect to different reading conditions. The voltage values shown for the output terminals relate to terminals 46 and 50 of the FIG. 4 and FIG. 5 detectors.

FIG. 10 illustrates the geometry that is preferred for sizing and locating the photo-active surfaces for the paired photodiodes 34 and 35 in each detector and also for locating individual detectors such as 36 relative to each other in the detector array 33. FIG. 10 also shows the relation of the various detector photodiodes 34 and 35 to the binary coded information dot sizes and spacings encountered in a typical code matrix block reading application. The dimensions S, $S_{min}$, and $S_{max}$ relate to spacing between adjacent dots in both file and row directions. In most applications of this invention such dimensions will correspond to the values given in the above Table I. Also, the dimensions D, $D_{max}$, and $D_{min}$ may be taken from such Table I. As previously explained, the individual dots 21 (or 23) are not sharply delineated; hence, mid-ordinate values in the existing Gaussian distribution of film density amplitudes serve to establish reference points.

The paired photodiodes 34 and 35 in an individual detector such as 36 are preferably located along a line oriented at a 45° angle relative to row direction 26. As indicated previously, row direction 26 generally corresponds to the direction of film travel shown by the outlined arrows. The paired photodiodes in a particular detector are also spaced apart from each other a sufficient distance to detect the maximum density difference that may exist relative to a binary coded information dot and its surrounding background. Since inter-dot densities in conventionally recorded code matrix block exist in both file and row directions, a 45° departure relative to row direction will establish an optimum condition for detection of a dot relative to dot background if spacing between the paired photodiodes is adequate. The best possible spacing is realized in instances when the second photodiode in a detector pair is located mid-way between all possibly adjacent dots during a condition of alignment of the paired first photodiode with one of the dots. Thus, it is preferred that the photodiode spacing (center to center) along files and along rows have a value of approximately $S_{min}/2$. Such spacing distances are designated $a'$ and $a''$ in FIG. 10. The spacing between photodiodes in a pair is $a'''$ which is the square root of the sum of the squares of $a'$ and $a''$ (see FIG. 9(*a*)). For applications of the instant invention, we prefer that the individual photodiodes have an active surface diameter *d*. The spacing (center to center) between adjacent detectors in array 33 in file direction 25 is designated as *b*. Table II is provided below to give the preferred values and ranges of values for such dimensions. Also, the last column in Table II gives the absolute value that is preferred for the indicated dimensions in applications involving the reading of code matrix blocks complying with the above-referenced specification MIL–STD–782B (Wep).

TABLE II

| Symbol | Description | Preferred value | Specification application value (in.) |
|---|---|---|---|
| d | Photodiode active surface diameter. | $\frac{D_{min.}}{3} < d < D_{min.}$ | 0.003 |
| a′ | Photodiode spacing, center to center in pair along file. | $\left(\frac{D_{max.}}{2}+\frac{d}{2}\right) < a' \ngtr \frac{S_{min.}}{2}$ | 0.0075 |
| a″ | Photodiode spacing, center to center in pair along row. | $a'$ | 0.0075 |
| a‴ | Photodiode spacing, center to center in pair. | $\sqrt{2}\,a'$ | 0.010 |
| b | Detector spacing, center to center along file. | $[(S_{min.}-D_{max.})-d] < b < (D_{min.}+d)$ | 0.0035 |

Detector array 33 extends in the file direction a greater distance than the extent of the files of the code matrix block 16 that is to be read. Such over-extension permits variations in film position relative to the detector array and variations in code matrix block position relative to the film edge to be accommodated without loss of binary information.

Since it is possible for two or more immediately adjacent detectors 36 in array 33 to detect a single binary coded information bit, it is important that means be incorporated in the code matrix reader to eliminate redundancy. Accordingly, FIG. 11 illustrates logic means which may be used in a code matrix reader to eliminate the redundancy that exists in output of detector array 33; the drawing notations in FIG. 11 for included conventional logic elements are in accordance with United States Government Specification MIL–STD–806B requirements. Basically, redundancy elimination logic 28 is comprised of an array of OR gates 62*a* and subsequent that cooperate with detector array 33 and an array of AND gates 63*a* and subsequent cooperably connected to the OR gate array. In some applications diodes 64*a* and subsequent may be advantageously included to eliminate low level spurious signals that otherwise would appear in the output of logic network 28. The illustrated terminals 65*a* and subsequent may be considered as the input terminals to conventional computer programming in logic 29, or in the case of apparatus having a capability of reading relatively skewed files, as the inputs to a conventional shift register means (not shown).

Each OR gate 62 accomplishes an "inclusive or" function, and receives input signals from any one or more of three successive detectors 36. In this regard it should be noted that the detectors 36 of the preferred FIG. 11 arrangement, except when located at an array extreme position, alternately function either with a single OR gate or with two successive OR gates 62. By way of example, detectors 36*b*, 36*d*, and 36*f* each provide input signals only to one cooperating OR gate 62; the alternate detectors such as 36*c*, 36*e*, and 36*g* are each arranged to provide their output signal to each of two immediately adjacent OR gates such as 62*a* and 62*b*, 62*b* and 62*c*, and 62*c* and 62*d*, respectively. Since OR gates 62 are each normally provided in the form of directionally-conducting diodes, they additionally function to reject detector signals of undesired polarity.

Each AND gate 63 in the AND gate array of logic 28 cooperates with an associated OR gate 62. Also, each AND gate 63, except when located at an extreme position in logic network 28, is arranged to accomplish a blocking function with respect to both of the two AND gates 63 positioned immediately adjacent thereto. More specifically, AND gate 63*b* is arranged to accomplish a blocking function as to both of immediately adjacent AND gates 63*a* and 63*c* whenever it is activated. The extreme AND gates, e.g., AND gate 63*a*, in the AND gate array of logic 28 accomplish a blocking function only as to the one AND gate immediately adpacent thereto, e.g., AND gate 63*b*.

The FIG. 11 arrangement is provided with circuit features whereby detector 36 output signals having a positive potential only are in essence conducted through logic 28. Conversely, zero or negative potentials are utilized to indicate the absence of a bit (dot) of binary coded information. As shown in FIG. 11, the positive potential signal developed by a detector 36 and appearing at the output of an OR gate 62 appears at the output of the associated AND gate 63 only if the voltage of the output of each immediately adjacent AND gate 63 is zero or negative. By way of example, a positive potential appearing at the output of AND gate 63*d* appears also as one of the inputs to each of adjacent AND gates 63*c* and 63*e*. Since AND gates 63*c* and 63*e* will pass a positive potential appearing at the output of OR gates 63*c* and 62*e*, respectively, only if the two additional inputs to each such AND gate are of a relatively low (zero) or negative potential, AND gates 63*c* and 63*e* are inactivated or blocked by operation of the OR gate 62*d* and AND gate 63*d* positive potential output.

Diodes 64 are necessary in logic 28 only in those instances wherein low level positive potentials would otherwise appear at terminals 65 and be the source of low-level spurious signals in the output prior to complete blocking of particular AND gates 63. Thus, as in the case of silicon diodes, advantage is taken of the low conductance characteristics at low voltage values.

An understanding of the operation of redundancy elimination logic 28 in reading a code matrix block 16 may be developed with reference to FIGS. 12(*a*) through 12(*f*). Dots 21*a*, 21*b*, and 21*c*, representing nominal, and maximum size positive bits of binary coded information, respectively, are shown in FIG. 12 in various aligned relations to individual photodiodes 40 and 41 and detectors 36 in array 33. In the FIG. 12(*a*) showing, none of dots 21 is positioned in aligned relation with any operable element of array 33. Since none of detector pairs 36 sense a light intensity difference, all of the outputs to associated OR gates 62 are zero. Each of the cooperating AND gates 63 in logic 28 is therefore in a condition whereby it might be activated by the first-received positive potential appearing as an output of the associated OR gate 62.

FIG. 12(*b*) illustrates a condition wherein film 22 has been advanced rightwardly to obtain initial coincidence between dot 21*a* and the photodiode 40 of detector 36*c* and also between dot 21*c* and the leading photodiode 40 of detector 36*l*. Since dot 21*c* is largest, the first light intensity difference will be detected by detector 36*l* if all of the illustrated dots 21 are aligned with respect to each other in a direction at right angles to the direction of film movement. The positive potential output signal developed in detector circuit 36*l* appears as the output of OR gate 62*f* and therefore as an input to AND gate 63*f*. Such output/input signal appears as the output of AND gate 63*f* and also appears as a blocking input to each of AND gates 63*e* and 63*g*. By this means, light intensity differences subsequently detected by detectors 36*k* and 35*m* (FIG. 12(*c*)) produce positive potentials that are blocked from output terminals 65*e* and 65*g* by the inactivated state of AND gates 63*e* and 63*g*; however, the positive potential developed in detector circuit 36*l* is because of its relative magnitude, passed through diode 64*f* to appear at terminal 65*f*. Also, it should be noted that light intensity differences developed in detectors 36*i*, 36*j*, and 36*k* as a result of the FIG. 12(*d*), 12(*e*), and 12(*f*) conditions of dot 21*c* produce potentials that are zero or possibly negative (see FIG. 9(*c*)) and thus are not passed through the OR gate or the AND gate arrays.

Referring again to the showing of FIG. 12(*b*), the light intensity difference detected in detector 36*c* as a result of the coincidence of its leading photodiode 40 with dot 21*a* will establish a positive potential signal that is an input for both of OR gates 62*a* and 62*b*. For the purpose of this invention, it is not important that the so-developed signal appear at a particular one of the associated two successive logic OR gate or AND gate elements. In the described situation, the signal produced as a result of the FIG. 12(*b*) position of dot 21*a* may be processed through either of AND gates 63*a* or 63*b*; the positive potential signal will be blocked from all except one of the information-processing channels. The further rightward movement of film 22 to develop coincidence and detect different light intensities by means of the relation of dot 21*a* to detectors 36*b* and 36*d* (FIG. 12(*c*)) results in additional detector positive voltage output signals; however, such signals are blocked from being a part of the output of logic network 28 by means of the functioning of the previously activated one of AND gate 63*a* or AND gate 63*b*. Continued rightward movement of film 22 to establish conditions whereby the lagging photodiodes 41 of the various detector pairs 36 receive the less intense light caused by dot 21*a* and produce relatively negative signals that inherently are not processed into the output for logic network 28.

FIG. 12(*c*) illustrates a situation wherein minimal size dot 21*b* simultaneously coincides with the leading photodiodes 40 of detectors 36*g* and 36*h* in equal degrees. It is not required in FIG. 11 arrangement that any particular one of the successive detectors develop the required positive potential output. Thus, accurate reading is accomplished if the output signal is originated by either detector 36*g* or detector 36*h*.

I claim:

1. An apparatus for reading binary-coded information recorded on moving photographic film by bits at adjacent bit positions contained in a file that is oriented transverse to the direction of film movement and by contrasting degrees of film light transmission, and comprising:

(a) Light-producing means providing light of uniform intensity at one surface of the film;

(b) An array of detectors receiving light from the other surface of the photographic film;

(c) A pair of matched-performance photodiode means, an output terminal, and interconnecting circuit means comprising each detector in said array and producing a first level voltage at said output terminal when one of said photodiode means receives a quantity of light through said film from said light-producing means that is greater than the quantity of light received by the other of said photodiode means and producing a second level voltage different from said first level voltage at said output terminal when said other photodiode means receives a quantity of light through said film from said light-producing means that is greater than the quantity of light received by said one photodiode means; and (d) Logic circuit means connected to said detector output terminals and having logic output terminals corresponding in number to the number of bits contained in said file;

said array having more than one said detector for each nominal bit position contained in said file, and said logic circuit means blocking from said logic output terminals all the redundant voltages of one of said voltage levels produced at said detector output terminals.

2. The invention defined by claim 1, wherein each pair of said matched-performance photodiode means receives light transmitted through the photographic film at two discrete detector areas, said discrete detector areas being positioned in fixed relation to each other with their area centers on a line oriented approximately 45° relative to said direction of film movement and apart a sufficient distance whereby said discrete detector areas do not overlap in directions normal to said direction of film movement.

3. The invention defined by claim 1, wherein said binary-coded information is recorded on the photographic film at least in part by adjacent circular film areas of nominal diameter D within a range of diameters from $D_{min}$ through $D_{max}$ positioned with their area centers at least a distance S within a range of distances from $S_{min}$ through $S_{max}$ apart along directions corresponding to said direction of film movement, and wherein each pair of said matched-performance photodiode means receives light transmitted through the photographic film at two discrete essentially circular detector areas, said circular detector areas having a diameter in the range of from $D_{min}/3$ to just less than $D_{min}$ and being positioned in fixed relation to each other with their centers on a line oriented approximately 45° relative to said given direction and apart a distance corresponding to $\sqrt{2a'}$ where $a'$ is greater than $$\left[\frac{D_{max}}{2}+\frac{d}{2}\right]$$

but not greater than $S_{min}/2$ and preferably just less than $S_{min}/2$.

4. The invention defined by claim 3, wherein said discrete circular detector areas are positioned in parallel leading and lagging lines that are oriented generally normal to said direction of film movement, each of said discrete circular detector areas in one of said lines being positioned with its center apart from the center of each immediately adjacent discrete circular detector area in said line a distance which is greater than $$[(S_{min}-D_{max})-d]$$

but less than $(D_{min}+d)$.

5. The invention defined by claim 1, wherein said logic sircuit means is comprised of an array of OR gate circuits connected in series with an array of AND gate circuits, each OR gate circuit in said array of OR gate circuits being connected to said array of detectors to receive input voltages from at least two of said detector output terminals immediately adjacent each other and performing an "inclusive or" function, and each AND gate circuit in said array of AND gate circuits being connected to said array of OR gate circuits to receive input voltages gated by one of said OR gate circuits and blocking voltages from each immediately adjacent AND gate circuit and performing a redundancy elimination function by conducting each gated input voltage to each immediately adjacent AND gate circuit as a blocking voltage and to one of said logic output terminals as a read bit of said binary-coded information.

References Cited

UNITED STATES PATENTS

| | | | |
|---|---|---|---|
| 2,050,316 | 8/1936 | Gulliksen. | |
| 2,446,046 | 7/1948 | Hurley | 250—210 X |
| 2,961,548 | 11/1960 | Prell | 250—210 X |
| 3,072,889 | 1/1963 | Willcox. | |
| 3,341,691 | 9/1967 | Modersohn et al. | |

WALTER STOLWEIN, Primary Examiner

C. M. LEEDOM, Assistant Examiner

U.S. Cl. X.R.

250—210, 212; 307—311